US006293140B1

United States Patent
Lohberg

(10) Patent No.: US 6,293,140 B1
(45) Date of Patent: Sep. 25, 2001

(54) DEVICE FOR DETECTING THE ROTARY BEHAVIOR OF A VEHICLE WHEEL

(75) Inventor: Peter Lohberg, Friedrichsdorf (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/194,283

(22) PCT Filed: Apr. 16, 1997

(86) PCT No.: PCT/EP97/01885

§ 371 Date: Aug. 25, 1999

§ 102(e) Date: Aug. 25, 1999

(87) PCT Pub. No.: WO97/44673

PCT Pub. Date: Nov. 27, 1997

(30) Foreign Application Priority Data

May 22, 1996 (DE) .............................. 196 20 581

(51) Int. Cl.[7] .................................................. B60C 23/00
(52) U.S. Cl. ............................................................ 73/146
(58) Field of Search .................................. 73/146, 146.2, 73/146.5

(56) References Cited

U.S. PATENT DOCUMENTS 3,225,810 * 12/1965 Enabnit .
3,750,120    7/1973 McCarty .
4,570,152 *  2/1986 Melton et al. ..................... 73/146.2
5,895,854 *  4/1999 Becherer et al. ..................... 73/146

FOREIGN PATENT DOCUMENTS 39 42 573   6/1991 (DE) .
44 35 160   4/1996 (DE) .

OTHER PUBLICATIONS

62–177453, Jan. 23, 1988, Patent Abstracts of Japan.
61–198063, Jan. 24, 1987, Patent Abstracts of Japan.
07–2 80 821, Oct. 27, 1995, Japan.
Stöcker, Jörg, u.a.: Der"Intelligente Reifen"—In: ATZ Automobiltechnische Zeitschrift 97, 1995, 12, S.824–832; Bild 5,6.

* cited by examiner

Primary Examiner—Eric S. McCall
(74) Attorney, Agent, or Firm—Rader, Fishman & Grauer PLLC

(57) ABSTRACT

A device for detecting the rotational behavior of a vehicle wheel includes an encoder with permanent magnet areas, a stationary measurement transducer sensitive to magnetic fields, and electric circuits for evaluating the output signals of the measurement transducer. The permanent magnet areas are embedded into the tire wall of the vehicle wheel or applied to the tire wall. The measurement transducer includes two or more measuring elements which are arranged at a different radial distance from the axis of rotation and positioned in such a manner that upon distortion of the tire as a result of forces acting upon the tire, there is a change of the phase position between the measurement signals issued by the measuring elements. This change of the phase position is evaluated as a measure of the torque transmitted from the wheel to the road surface and/or as a measure of the instantaneous coefficient of friction.

10 Claims, 4 Drawing Sheets

DEVICE FOR DETECTING THE ROTARY
BEHAVIOR OF A VEHICLE WHEEL

BACKGROUND OF THE INVENTION

The present invention relates to a device for detecting the rotational behavior of a vehicle wheel, which includes an encoder rotating with the wheel and having permanent magnet areas that are evenly distributed in a circumferential direction and follow one another with alternating polarity, and a stationary measurement transducer sensitive to magnetic fields which furnishes an output signal representative of the rotational movement, and an electric circuit to evaluate the output signals of the measurement transducer.

A device for detecting rotational or angular movements is disclosed in WO 95/17680. The measurement device includes a measurement transducer in the shape of an encoder which rotates with the wheel and has a plurality of permanent magnet areas that are arranged so as to be evenly distributed in the direction of rotation over the entire periphery of the encoder. As a measurement transducer, an active measuring element is arranged stationarily at the periphery of the encoder in such a manner that the variations of the magnetic field which are due to the rotation produce signals at the output of the measuring elements or measurement transducer which indicate the rotation.

Passive and active measurement devices for detecting the rotational behavior of vehicle wheels are numerous and manifold in the state of the art. An electric signal representative of the rotational movement is, among others, required as an input quantity of automotive vehicle control systems, such as antilock systems (ABS), traction slip control systems (TCS), driving stability control systems (DSC, ASMS), etc. The necessary effort in manufacture beside a reliable mode of operation is of major significance for these cases of application, even more so because most of the systems require several sensors, i.e., one individual rotational speed sensor for each vehicle wheel. Therefore, the search for an especially inexpensive sensor is the objective of intensive development work.

An object of the present invention is to develop a measurement device of the type mentioned hereinabove which involves, above all, reduced efforts in manufacture and assembly and ensures a high degree of reliability.

SUMMARY OF THE INVENTION

It has been found that this object can be achieved by a device providing that the permanent magnet areas are made of a material on a barium-ferrite basis which is embedded into the tire wall or applied to the tire wall, that the measurement transducer includes two or more measuring elements which are offset in the direction of rotation of the wheel and arranged at a different radial distance from the axis of rotation, namely in such a manner that upon distortion of the tire as a result of forces acting upon the tire or due to the drive or brake torques transmitted, there is a shift of the phase position between the measurement signals issued by the measuring elements, and in that the shift of the phase position can be evaluated as a measure of the torques transmitted from the wheel and the tire to the road surface and/or as a measure of the instantaneous coefficient of friction.

Thus, the present invention is based on the knowledge that, as a measurement transducer, it is possible to use a magnetized track embedded into the tire wall or applied to this wall, on the one hand, and that, on the other hand, when two or more offset sensors or measuring elements are used, the torsional stress of the tire or the tire wall can be evaluated in addition to the measurement of the rotational or angular movements in order to measure the transmitted torques and/or the instantaneous coefficient of friction.

Further details, advantages and possible applications of the present invention can be seen on the following description making reference to the accompanying drawings.

BRIEF DESCRIPTION OF THE DRAWINGS

In the drawings, in a schematically simplified illustration.

DETAILED DESCRIPTION OF THE INVENTION

Figure 1:
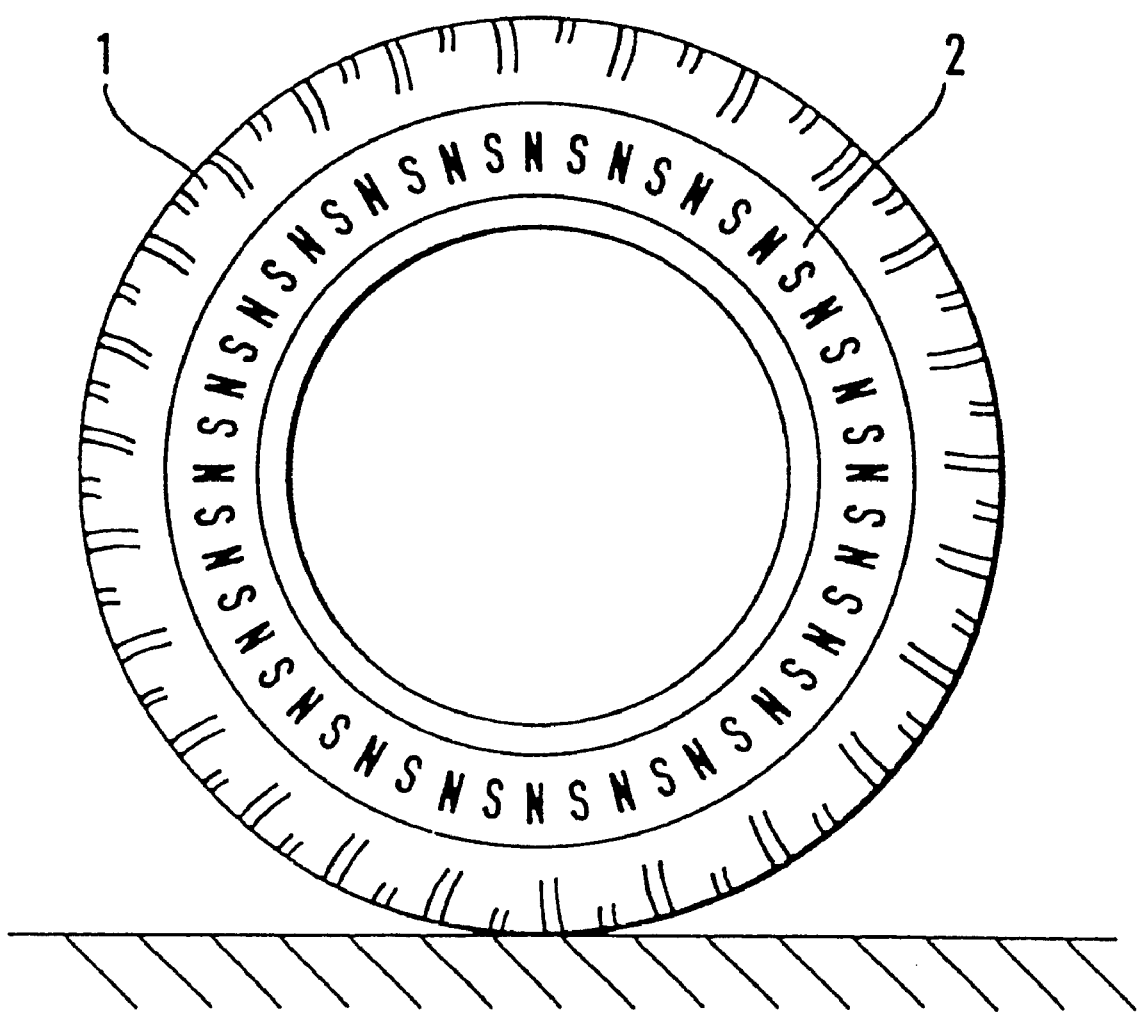
FIG. 1 is a side view of a tire of the present invention with magnetized areas embedded in the tire wall.

FIG. 1 shows an example of a tire 1 with permanent magnet areas N, S evenly distributed over the entire periphery. An integral sequence of similar, alternating north and south pole areas N or S are embedded into the side wall of the air tire 1 and form a closed circular course or magnetized track 2 which is concentric relative to the center of the tire. Such an embodiment is suitable in connection with a stationary measurement transducer for measuring the rotational behavior of a vehicle wheel, for example, as an input quantity of an automotive vehicle control system (ABS, TCS, ASMS, etc.). The magnetized areas N, S integrated in the tire wall or arranged on the tire wall serve as a signal generator or measuring data emitter.

Figure 2:
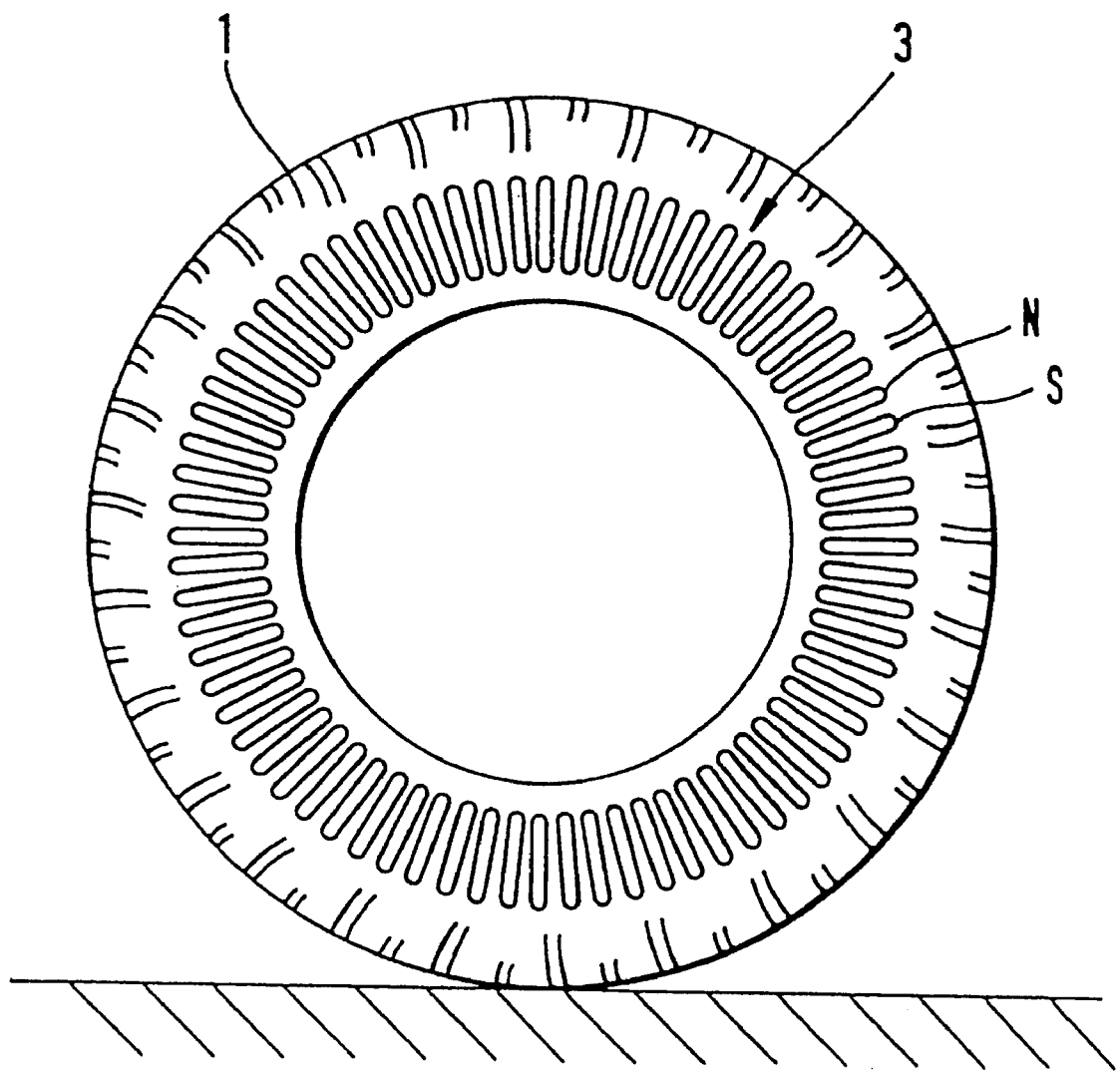
FIG. 2 is a similar view of another embodiment of a tire.

A still higher angular resolution may be achieved by the embodiment of FIG. 2. The encoder in the form of a circular coding track 3 in this case includes linear north and south poles or magnetized areas N, S which, similar to the FIG. 1 embodiment, are alternating. Such a design is especially suitable as a signal generator or encoder for the device of the present invention.

To scan the tracks 2, 3 formed of the magnetic areas N, S, a measurement transducer 4 is used which is stationary in relation to the tire or, respectively, the coded track. Active sensors or measuring elements with magnetoresistive sensor elements or Hall elements are especially appropriate for use. Basically, however, all types of signal pickups or types of sensors may be used which react to permanent magnet fields, the variations of these fields, or to alternations of polarity. It is, of course, also possible to employ passive signal pickups or coil systems where signals are induced due to the change in the magnetic field caused by rotation of the tire.

Figure 3:
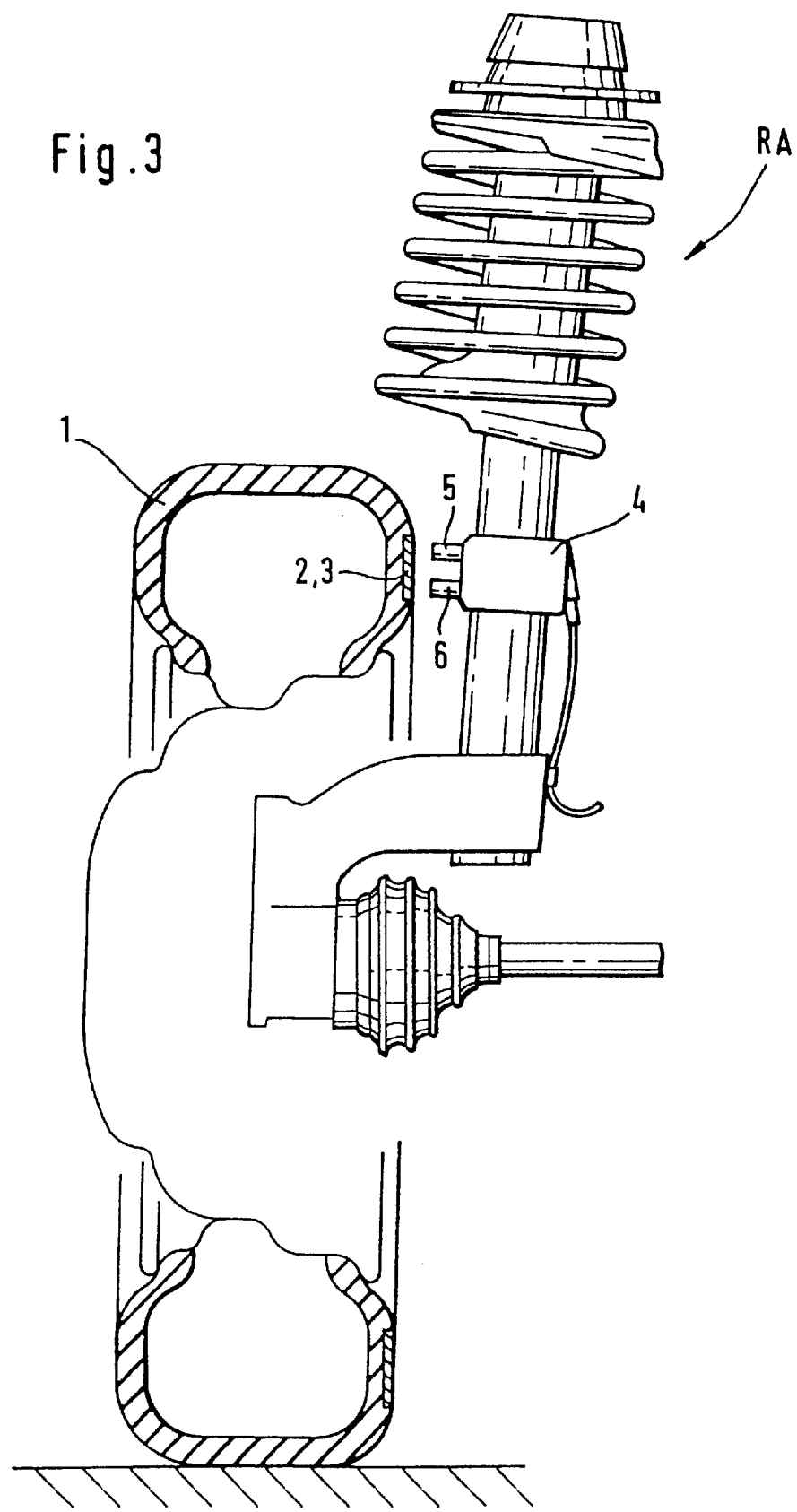
FIG. 3 is a cross-sectional view of a vehicle wheel with a device according to the present invention and with elements of the associated wheel suspension.
Figure 4:
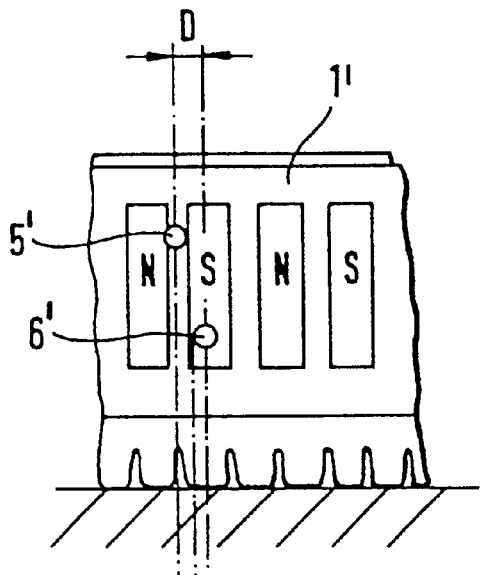
FIG. 4 is a symbolic cross-sectional view of a tire wall and the output signals of a measurement transducer.
Figure 4:
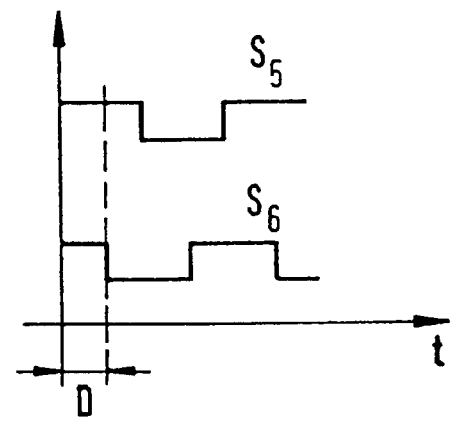
Figure 5:
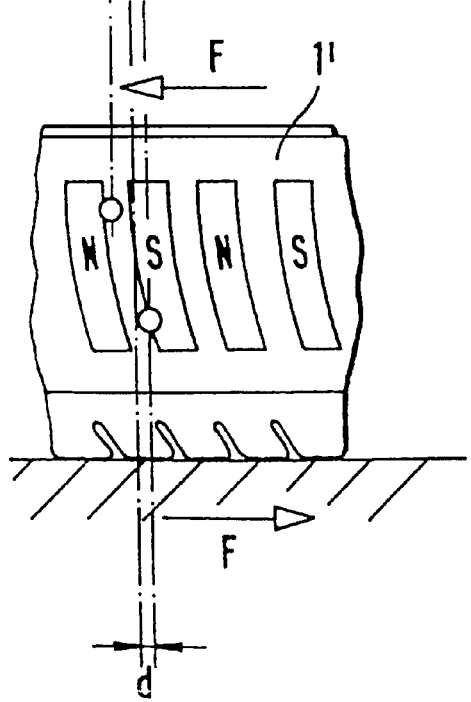
FIG. 5 is a view similar to FIG. 3 showing the tire cross-section and the signal when the tire is exposed to increased load.
Figure 5:
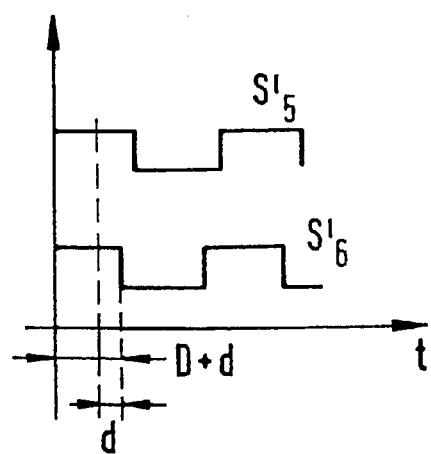

FIGS. 3, 4, and 5 serve to explain a particularly preferred embodiment of the device of the present invention. In this case, as is shown in FIG. 3, a measurement transducer 4 with two measuring elements 5, 6 is arranged at the level of the tire wall or at the level of the track 2, 3 at the wheel suspension RA, or at any suitable holder mechanism connected to the vehicle. For example, both measuring elements 5, 6 may comprise magnetoresistive sensor elements as magnetic-field-sensitive members.

The two measuring elements 5, 6 are offset in relation to each other, as is shown by the tire portions 1' which are illustrated on the left-hand side in FIGS. 4, 5. Reference numerals 5', 6' in FIG. 4 designate the 'reading' points of the sensors or measuring elements 5, 6. The local shift D (see FIG. 4) is chosen so that a defined number of pole pairs N, S is enclosed between the reading points 5' and 6'.

As shows the course of the measuring element output signals $S_5$, $S_6$ in the curve diagram of FIG. 4, the measuring elements 5, 6 which are offset in relation to each other by the distance D will supply in this case upon each wheel rotation signals which are deferred and permit identifying or calculating the rotational behavior, such as rotational speed, acceleration, deceleration and direction of rotation.

As is known, the drive or brake torques exerted on a vehicle wheel cause a distortion of the tire in the fashion represented in FIG. 5. Under the influence of the pair of forces F (see FIG. 5), the tire wall 1' and, thus, additionally the direction of the magnetized areas N, S or strips 3 (see FIG. 2) is deformed in the direction of torsion.

Due to the torsion-induced deformation, there occurs a local shift d of the magnetized strips or areas N, S, especially in the zone of each strip close to the tire contact area, in relation to the stationary measuring elements 5, 6 (see FIG. 3). The result of this deformation is a variation of the reciprocal phase position of the signals $S_5$, $S'_5$ and $S6$, $S'_6$. This phase shift of the signals becomes particularly apparent in a comparison of FIGS. 4 and 5.

To evaluate the phase shift, the relation between the torque M transmitted from the wheel to the road and the phase shift D+d is expediently drafted as a table in a memory of the evaluating electronic unit (not shown) and taken into account for evaluating the signal.

The measurement of the torque M by way of the device of the present invention on the basis of the physical conditions, which have been explained by way of FIGS. 4 and 5, can be evaluated to improve the control system, because these measured values permit making conclusions with respect to the coefficient of friction or friction value between tires and road.

To provide the magnetizable areas, a small quantity of barium ferrite powder, if necessary, compounded with a portion of strontium, is introduced in a homogeneous distribution during manufacture of the tire. As an alternative, it is also possible to use, for example, rubber foils of roughly 1 mm thickness, into which the magnetizable material is embedded for the provision of the coded track or the magnetizable areas N, S. This rubber foil is then cemented to the lateral tire wall and magnetized (see FIG. 3).

What is claimed is:

1. A device for detecting rotational behavior of a vehicle wheel on a road surface, comprising:

a tire made of a rubber substance;

an encoder rotating with the vehicle wheel and having permanent magnet areas with alternating polarity that are evenly distributed in a circumferential direction of the vehicle wheel;

a stationary measurement transducer sensitive to magnetic fields for providing an output signal representative of the rotation movement of the wheel, the measurement transducer including a plurality of measuring elements that are offset from each other by a predetermined distance in both a radial and angular direction with respect to an axis of rotation of the vehicle wheel to define a first phase shift in the output signal; and an electric circuit for evaluating the output signal of the measurement transducer, wherein a deformation in the vehicle tire causes a second phase shift different than the first phase shift indicative of a torque transmitted from the vehicle wheel to the road surface.

2. A device as claimed in claim 1, wherein the distance between said plurality of measuring elements is chosen so that at least one pole pair is disposed between two measuring elements.

3. A device as claimed in claim 1, wherein the measurement transducer is configured as an active measurement transducer comprising magnetoresistive sensor elements or Hall effect sensor elements.

4. A device as claimed in claim 1, wherein the measurement transducer is configured as a passive measurement transducer comprising passive signal pickups or coil systems.

5. A device as claimed in claim 1, wherein the permanent magnet areas are arranged in a track.

6. A device as claimed in claim 5, wherein the track is concentric relative to the axis of rotation of the vehicle wheel.

7. A device as claimed in claim 1, wherein the permanent magnet areas comprise a compound of barium ferrite powder and strontium.

8. A device as claimed in claim 7, wherein the compound of barium ferrite powder and strontium is introduced into the vehicle tire during the manufacturing process.

9. A device as claimed in claim 1, wherein the permanent magnet areas comprise a magnetized rubber foil attached to the vehicle tire.

10. A device as claimed in claim 9, wherein the magnetized rubber foil has a thickness of about 1 mm.

* * * * *